E. LONGSTRETH,

Assignor to himself, G. BURNHAM, C. T. PARRY, E. H. WILLIAMS, W. P. HENSZEY and J. W. CONVERSE.

Exhaust Apparatus for Locomotives.

No. 9,389. Reissued Sept 28, 1880.

WITNESSES.

J. M. Dumer.

Henry Howson Jr

INVENTOR

Edward Longstreth by his Attorneys.

Howson and Son

N. PETERS, PHOTO-LITHOGRAPHER, WASHINGTON, D. C.

UNITED STATES PATENT OFFICE.

EDWARD LONGSTRETH, OF PHILADELPHIA, PENNSYLVANIA, ASSIGNOR TO HIMSELF, GEO. BURNHAM, CHARLES T. PARRY, EDWARD H. WILLIAMS, WM. P. HENSZEY, AND JOHN H. CONVERSE.

EXHAUST APPARATUS FOR LOCOMOTIVES.

SPECIFICATION forming part of Reissued Letters Patent No. 9,389, dated September 28, 1880.

Original No. 186,587, dated January 23, 1877. Application for reissue filed August 9, 1880.

*To all whom it may concern:*

Be it known that I, EDWARD LONGSTRETH, of Philadelphia, Pennsylvania, have invented certain Improvements in Exhaust Apparatus for Locomotives, of which the following is a specification.

The object of my invention is to so dispose of the exhaust-steam of locomotive-engines, and especially of the engines used in and near towns and cities, that its discharge shall not be accompanied with the disagreeable noise which tends to frighten horses and has hitherto been a serious objection to the use of locomotives on street-railways. This object I attain in the manner which I will now proceed to describe, reference being had to the accompanying drawings, in which—

Figure 1:
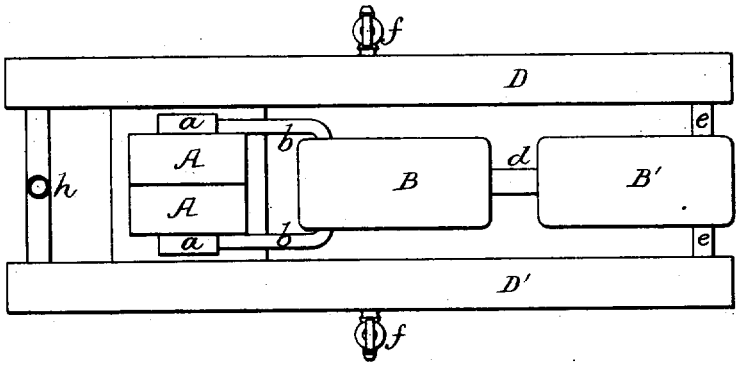
Figure 2:
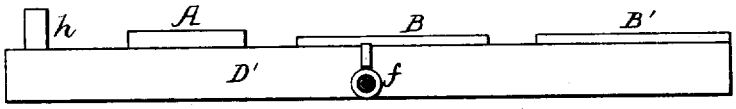

Figure 1 is a plan view, and Fig. 2 a side view, illustrating the apparatus by which my invention may be carried into effect.

A A represent the two cylinders of the engine, and *b b* the two exhaust-pipes, each of which communicates with a vessel, B, the latter communicating, through a contracted neck, *d*, with a like vessel, B′, and the latter through two branches, *e e*, with pipes D D′, each of which is furnished with a cock, *f*, the latter being under the control of the engineer, and these two pipes communicating with the discharge-tube *h*. It should be understood that each of these vessels B and B′ is closed, excepting at the inlets and outlets.

The sharp intermittent noises which accompany the movements of locomotive-engines, and which are generally attributed to the escape of puffs of exhaust-steam from the top of the chimney, are created at the point where the steam is first forcibly expelled through the exhaust-ports of the cylinder, the chimney being simply a conductor of the sound. I have ascertained that this noise may be prevented by permitting the exhaust-steam to suddenly expand at a point as near as possible to that where the sound originates, and after expansion to pass through a contracted outlet. Thus the exhaust-steam discharged through the pipes *b* is suddenly expanded on reaching the vessel B, whence it escapes through the contracted neck *d* into a similar vessel, B′, the escape of the steam from which would be accompanied with comparatively little noise. This treatment of the exhaust-steam may be still further continued by causing it to pass from the vessel B′, through contracted branches *e e*, into pipes D D′, of large diameter, wherein part of the steam is condensed, the remainder passing noiselessly through the pipe *h*, and thence through the chimney.

The water of condensation may be discharged from the pipes D D′ from time to time by opening the cocks *f*.

One vessel, B, only may be used, providing it be of sufficient capacity.

It is essential to my invention that the outlet of each vessel should be restricted to a size not larger than sufficient to permit the free escape of the exhaust-steam, for it is the sudden expansion of this steam and its momentary confinement in the vessel which tend to absorb the noise-creating shocks.

Practical tests have determined the efficacy of the above-described appliances.

It will be understood that the arrangement of vessels B B′ and pipes D D′ will depend upon the construction of the engine, and, therefore, that I do not desire to confine myself either to any specified number of vessels B or to the precise construction and arrangement of the parts shown.

Although I have alluded to the disposal of exhaust-steam, it will be evident that my invention is applicable to the disposal of the compressed air or gases which may be used in place of steam in locomotive-engines.

I claim as my invention—

In a locomotive-engine, the combination of the steam-chests and their exhaust-passages with a vessel or vessels situated between the chests and the entrance to the chimney, and having direct and unobstructed communication with the said passages, and having a contracted but unobstructed outlet or outlets through which the exhaust-steam must pass from the vessels before it reaches the chimney, all substantially as set forth.

In testimony whereof I have signed my name to this specification in the presence of two subscribing witnesses.

EDWARD LONGSTRETH.

Witnesses:

H. R. SHULTZ,

HUBERT HOWSON.